United States Patent [19]

Bala et al.

[11] 4,108,712

[45] Aug. 22, 1978

[54] HEAT SEALING MACHINE WITH COOLING MEANS

[76] Inventors: Harry Bala, 2259 N. Kedzie, Chicago, Ill. 60647; John C. Mowli, 2032 W. Jarvis, Chicago, Ill. 60645

[21] Appl. No.: 770,604

[22] Filed: Feb. 22, 1977

[51] Int. Cl.² .............................................. B30B 15/34
[52] U.S. Cl. .................................. 156/498; 93/33 H; 93/DIG. 1; 156/515; 156/583
[58] Field of Search ............... 156/498, 515, 580, 311, 156/583; 93/33 H, DIG. 1; 53/39, 373; 219/78, 120

[56] References Cited

U.S. PATENT DOCUMENTS

| 2,621,704 | 12/1952 | Langer | 156/311 |
|---|---|---|---|
| 2,904,100 | 9/1959 | Fener | 93/DIG. 1 |
| 3,496,049 | 2/1970 | Anderson | 156/311 |
| 3,573,140 | 3/1971 | Griffith et al. | 156/583 |
| 3,692,613 | 9/1972 | Pederson | 156/498 |
| 4,062,718 | 12/1977 | Hay | 156/498 |

*Primary Examiner*—David Klein
*Assistant Examiner*—M. G. Wityshyn
*Attorney, Agent, or Firm*—George H. Gerstman

[57] ABSTRACT

Heat sealing apparatus is provided in which a heat seal head defines longitudinal slots which underlie a wire heating element and communicate with a cooling fluid path to provide rapid cooling to the heating element. The longitudinal slots have a width that is narrower than the width of the wire to provide wall supports on opposite sides of the wire.

11 Claims, 3 Drawing Figures

HEAT SEALING MACHINE WITH COOLING MEANS

BACKGROUND OF THE INVENTION

This invention relates to apparatus for heat sealing plastic sheets and, more particularly, heat sealing apparatus having rapid cooling means.

In the process of impulse heat sealing of thermoplastic materials, an electrically conductive wire is generally heated by a short burst of electrical current. Typically, it is necessary to continue maintaining the wire and the plastic under pressure until the plastic is sufficiently cooled, otherwise the heat seal may be defective.

Using ambient cooling, an eight-second cooling period is common. If water cooling is used, the cooling time may be reduced. However, water cooling may be a problem because it requires the constant circulation of water. Since the wire heating element must be replaced frequently, such replacement is difficult where water cooling is involved because the water-carrying assembly must be disassembled. Thus water cooling is a relatively messy operation. Additionally, water cooling is relatively inefficient because while the water aids to cool the heat seal head, the wire heating element is only cooled indirectly.

Atomized liquid cooling of the wire heating element in the impulse heat sealing of thermoplastic film has been disclosed in the prior art. For example, such atomized liquid cooling is disclosed in Anderson U.S. Pat. No. 3,496,049. However, the Anderson device is disadvantageous in that Anderson does not disclose any coolant fluid exhaust and, once the top jaw of Anderson's machine is closed, circulation of Anderson's cooling fluid may be inadequate.

Many of the disadvantages of prior art heat sealing apparatus are alleviated by the present invention. It is an object of the present invention to provide heat sealing apparatus with cooling means whereby the cooling means is effectively circulated for rapid cooling of the wire heating element.

Another object of the present invention is to provide heat sealing apparatus in which the cooling fluid is in direct contact with the wire heating element.

A further object of the present invention is to provide heat sealing apparatus in which the wire heating element is longitudinally cooled by overlying a number of longitudinal slots to which a cooling fluid is passed.

A still further object of the present invention is to provide heat sealing apparatus which is simple in construction and operates to significantly reduce the time for cooling down the wire heating element, thereby enabling more rapid heat sealing of thermoplastic materials.

SUMMARY OF THE INVENTION

In accordance with the present invention, there is provided heat sealing apparatus comprising a heat seal head and a wire heating element overlying the heat seal head. The heat seal head has a cooling fluid inlet and a cooling fluid exhaust and defines longitudinal slots which underlie the wire heating element. The longitudinal slots have a width that is narrower than the width of the wire to provide wall supports on opposite sides of the wire. A cooling fluid path couples the cooling fluid inlet and the cooling fluid exhaust to the longitudinal slots.

In one embodiment, the heat seal head is formed of electrically conductive material and electrically insulative means are interposed between the heat seal and the wire heating element.

In one embodiment, the heat seal head is formed of an electrically insulative material and the longitudinal slots are in direct communication with the wire heating element.

In the illustrative embodiment, the cooling fluid comprises air and means are provided for coupling a pressurized air supply to the air cooling inlet.

A more detailed explanation of the invention is provided in the following description and claims, and is illustrated in the accompanying drawings.

DETAILED DESCRIPTION OF THE ILLUSTRATIVE EMBODIMENT

Figure 2:
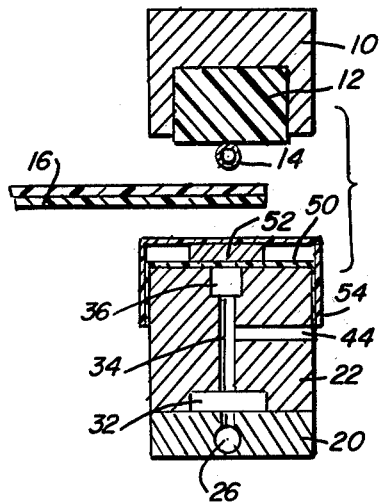
FIG. 2 is a cross-sectional view thereof, taken along the plane of the line 2—2 of FIG. 1.
Figure 1:
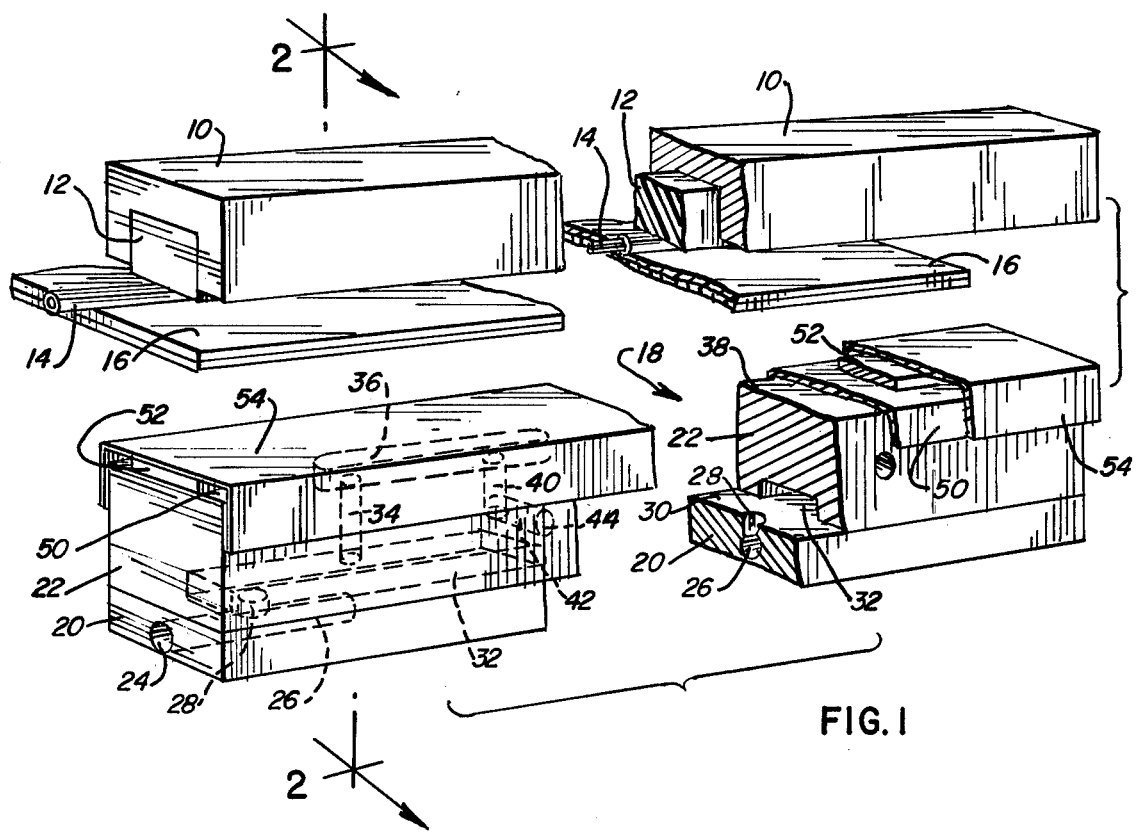
FIG. 1 is a perspective view, partially broken and shown in cross-section for clarity, of heat sealing apparatus constructed in accordance with the principles of the present invention.

Referring first to FIGS. 1 and 2, a heat sealing apparatus is shown therein comprising an upper heat seal pressure member 10 preferably formed of steel, a resilient spacer 12, preferably formed of silicone rubber, and a cut-off wire 14, preferably having a circular cross-sectional configuration and being coated with Teflon. The aforementioned upper portion of the heat sealing apparatus is conventional for use in sealing a plurality of thermoplastic materials 16, for example, a pair of thermoplastic sheets forming a conventional poly-bag, particularly during processing of rolls of continuous poly-bags.

It is to be understood that the upper assembly, comprising heat seal pressure member 10, spacer 12 and cut-off wire 14, could be a lower assembly, if desired, by inverting the apparatus structure.

In the illustrative embodiments, the lower assembly of the heat sealing apparatus includes a heat seal head 18, which heat seal head includes a lower bar portion 20 and an upper bar portion 22. Lower bar portion 20 preferably comprises an elongated member having a rectilinear cross-sectional configuration, with a cooling fluid inlet 24 at one end thereof and a channel 26 extending into the lower portion with an upwardly extending passage 28 communicating with the top surface 30 of lower portion 20.

Upper portion 22 defines an elongated chamber 32 which communicates with the top surface 30 of lower portion 20 and an upwardly extending channel 34 communicating with chamber 32 and with a plurality of longitudinally extending slots 36 which are defined at the top surface 38 of the upper member 22. A downwardly extending channel 40 communicates with each of longitudinal slots 36 and also with an orthogonal channel 42 which forms a cooling fluid exhaust 44.

It is seen that a cooling fluid path is defined via cooling fluid inlet 24, channel 26, path 28, chamber 32, channel 34, longitudinal slots 36, channel 40, channel 42 and cooling fluid exhaust 44.

In the FIGS. 1 and 2 embodiment, the lower and upper members 20, 22 are formed of thermally conductive material such as steel. The use of a steel material in constructing the heat seal head 18 enables economical manufacturing of the heat sealing apparatus. An insulative separating material 50 is positioned over upper member 22 to underlie wire heating element 52. The insulative spacer 50 is preferably formed of fiberglass material coated with Teflon, as is well-known in the heat sealing art. The wire heating element 52 preferably has a rectangular cross-sectional configuration and is preferably formed of Nichrome. An insulative member 54, similar to insulative member 50, is located over wire heating element 52 so that the wire heating element 52 will not directly contact the thermoplastic material 16 to be heat sealed.

Longitudinal slots 36 have a width that is less than the width of wire heating element 52. In this manner, the wire heating element 52 is supported by walls of the upper member 22. This will prevent the wire heating element from being substantially distorted when the heat sealing is in operation and the cut-off wire 14 and spacer 12 are pressing against insulative member 54 thereby applying a significant amount of pressure on wire heating element 52.

It is preferred that a number of equally spaced longitudinal slots 36 be defined by the upper member 22, with chamber 32 extending substantially the length of the heat seal head and acting as a manifold for a plurality of channels thereby forming a plurality of cooling paths. Preferably the cooling fluid is air under pressure and, to this end, a pressurized air supply is coupled to cooling fluid inlet 24. It is to be understood, however, that other cooling fluids may be used if desired.

Figure 3:
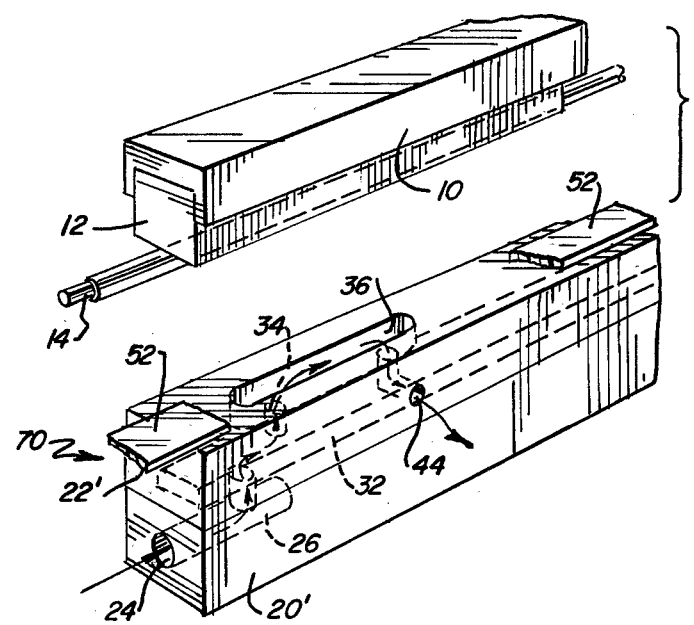
FIG. 3 is a perspective view of a heat sealing apparatus in accordance with a modified form of the invention.

A modified form of the invention is illustrated in FIG. 3. In the FIG. 3 embodiment, while the upper portion comprising heat seal pressure member 10, spacer 12 and cut-off wire 14 is identical to the upper portion of the FIGS. 1-2 heat sealing apparatus, top portion 22', of the heat seal head 70 is formed of an electrically insulative material, such as a ceramic material. While the cooling inlet, the cooling channels, longitudinal slots and cooling exhaust may be identical to those shown in the FIGS. 1-2 embodiment, there is no need to provide insulative spacer 50 because the ceramic portion 22' of heat seal head 70 will directly underlie wire heating element 52. In this manner, the cooling fluid will directly contact the wire heating element 52 instead of being in direct contact with the insulative spacer 50 (as in the FIGS. 1-2 embodiment) which underlies the wire heating element 52. Such direct contact will provide relatively rapid cooling of the wire heating element.

It is preferred that while top member 22' of the heat seal head 70 be formed of ceramic, the lower member 20' is formed of steel in the identical manner of forming lower member 20 of the FIGS. 1 and 2 embodiment. Thus lower member 20 of the FIGS. 1 and 2 embodiment may be identical to lower member 20' of the FIG. 3 embodiment, but the upper member 22 of the FIGS. 1 and 2 embodiment (which is formed of thermally conductive material) may be substituted for the upper member 22' of the FIG. 3 embodiment (which is formed of electrically insulative material). During use of the upper member 22 formed of electrically conductive material, an electrically insulative spacer 50 must be interposed between the upper member 22 and the wire heating element.

It is seen that a heat sealing apparatus has been provided which enables cooling fluid to be circulated and either directly communicated with the insulative support for the wire heating element or directly with the wire heating element itself. This enables rapid cooling of the wire heating element during processing, thereby providing an efficient heat sealing operation which is a significant improvement in the art.

Although two illustrative embodiments of the invention have been shown and described, it is to be understood that various modifications and substitutions may be made by those skilled in the art without departing from the novel spirit and scope of the present invention.

What is claimed is:

1. Heat sealing apparatus which comprises: a heat seal head; a wire heating element positioned adjacent said heat seal head; said heat seal head having a cooling fluid inlet and a cooling fluid exhaust; said heat seal head defining a longitudinal slot which is located in heat exchange relationship with said wire heating element during heat sealing, said longitudinal slot having a width that is narrower than the width of the wire, to provide wall supports on opposite sides of the wire; and a cooling fluid path coupling said cooling fluid inlet and the cooling fluid exhaust to said longitudinal slot, said cooling fluid exhaust being separate from but coupled to said longitudinal slot with said exhaust terminating away from said wire, whereby during heat sealing the cooling fluid can be circulated from the cooling fluid inlet to a heat exchange relationship with said wire and to the separate exhaust, enabling cooling fluid circulation during heat sealing.

2. Heat sealing apparatus as described in claim 1, said heat seal head being formed of electrically conductive material; and electrically insulative means interposed between said heat seal head and said wire heating element.

3. Heat sealing apparatus as described in claim 2, wherein said longitudinal slot is in direct communication with said electrically insulative means to cool said electrically insulative means directly under said wire heating element.

4. Heat sealing apparatus as described in claim 1, said wire heating element having a rectilinear cross-sectional configuration.

5. Heat sealing apparatus as described in claim 4, said wire heating element comprising a Nichrome wire.

6. Heat sealing apparatus as described in claim 1, said heat seal head being formed of an electrically insulative material.

7. Heat sealing apparatus as described in claim 6, wherein said longitudinal slot is in direct communication with said wire.

8. Heat sealing apparatus as described in claim 1, wherein a plurality of longitudinal slots are spaced along the top surface of said heat sealing head.

9. Heat sealing apparatus which comprises: a heat seal head formed of thermally conductive material; a wire heating element having a rectilinear cross-sectional configuration positioned adjacent said heat seal head; electrically insulative means interposed between said heat seal head and said wire heating element; said heat seal head defining a plurality of longitudinal slots spaced along a surface of said heat seal head with said longitudinal slots being in direct communication with said electrically insulative means to cool said electrically insulative means directly under said wire heating element, said heat seal head having a cooling fluid inlet and a cooling fluid exhaust; said longitudinal slots being located in heat exchange relationship with said wire heating element during heat sealing; each slot having a width that is narrower than the width of the wire, to provide wall supports on opposite sides of the wire; and a cooling fluid path coupling said cooling fluid inlet and said cooling fluid exhaust to each of said longitudinal slots, said cooling fluid exhaust being separate from but coupled to said longitudinal slots with said exhaust terminating away from said wire, whereby during heat sealing the cooling fluid can be circulated from the cooling fluid inlet to a heat exchange relationship with said wire and to the separate exhaust, enabling cooling fluid circulation during heat sealing.

10. Heat sealing apparatus as described in claim 9, wherein said heat seal head is formed of steel and said electrically insulative means comprises a Teflon coated material.

11. Heat sealing apparatus which comprises: a heat seal head; a wire heating element positioned adjacent said heat seal head; said heat seal head having an air inlet and an air outlet; said heat seal head defining a longitudinal slot which is in heat exchange relationship with said wire heating element during heat sealing; said longitudinal slot having a width that is narrower than the width of the wire, to provide wall supports on opposite sides of the wire; an air path coupling said air inlet and said air outlet to said longitudinal slot; said air outlet being separate from but coupled to said longitudinal slot with said air outlet terminating away from said wire, whereby during heat sealing the air can be circulated from the air inlet to a heat exchange relationship with the wire and to the separate air outlet; enabling air circulation during heat sealing; and means for coupling a pressurized air supply to said air inlet.

* * * * *